US009959146B2

(12) United States Patent
Ahuja et al.

(10) Patent No.: US 9,959,146 B2
(45) Date of Patent: May 1, 2018

(54) COMPUTING RESOURCES WORKLOAD SCHEDULING

(71) Applicant: Intel Corporation, Santa Clara, CA (US)

(72) Inventors: Nishi Ahuja, University Place, WA (US); Rahul Khanna, Portland, OR (US); Abishai Daniel, Beaverton, OR (US); Diyong Fu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 10 days.

(21) Appl. No.: 15/089,481

(22) Filed: Apr. 2, 2016

(65) Prior Publication Data

US 2017/0109205 A1 Apr. 20, 2017

Related U.S. Application Data

(60) Provisional application No. 62/244,156, filed on Oct. 20, 2015.

(51) Int. Cl.
  *G06F 9/46* (2006.01)
  *G06F 9/50* (2006.01)
  *G06N 99/00* (2010.01)

(52) U.S. Cl.
  CPC ............ *G06F 9/505* (2013.01); *G06F 9/5094* (2013.01); *G06F 2209/501* (2013.01); *G06N 99/005* (2013.01); *Y02B 60/142* (2013.01)

(58) Field of Classification Search
  None
  See application file for complete search history.

(56) References Cited

U.S. PATENT DOCUMENTS

| | | | |
|---|---|---|---|
| 2005/0132167 A1* | 6/2005 | Longobardi | G06F 9/5083 712/201 |
| 2007/0271560 A1* | 11/2007 | Wahlert | G06F 8/61 718/1 |
| 2008/0077544 A1* | 3/2008 | Sureka | G06K 9/6253 706/13 |
| 2009/0064156 A1* | 3/2009 | He | G06F 9/5066 718/104 |
| 2009/0327216 A1* | 12/2009 | Brown | G06F 17/30474 |

(Continued)

FOREIGN PATENT DOCUMENTS

WO 2015130613 A1 9/2015

OTHER PUBLICATIONS

International Search Report and Written Opinion for PCT Patent Application No. PCT/US2016/055056, dated Jan. 16, 2017, 18 pages.

*Primary Examiner* — Mehran Kamran
(74) *Attorney, Agent, or Firm* — Compass IP Law PC

(57) ABSTRACT

Examples may include techniques to a schedule a workload to one or more computing resources of a data center. A class is determined for the workload based on a workload type or profile for the workload. Predicted operating values for at least one of the one or more computing resources is determined based on the class and the predicted operating values are used as inputs in at least one scoring model to evaluate the workload being supported by the at least one of the one or more computing resources. The workload is then scheduled to the at least one or more computing resources based on the evaluation.

10 Claims, 9 Drawing Sheets

System 100

(56) References Cited

U.S. PATENT DOCUMENTS

| | | | |
|---|---|---|---|
| 2010/0313072 A1* | 12/2010 | Suffern | G06F 11/0706 714/37 |
| 2010/0313203 A1* | 12/2010 | Dawson | G06F 1/3203 718/102 |
| 2011/0166835 A1* | 7/2011 | Devarakonda | G06Q 10/06 703/2 |
| 2011/0213508 A1* | 9/2011 | Mandagere | G06F 1/3203 700/291 |
| 2012/0185867 A1* | 7/2012 | Archer | G06F 9/5066 718/105 |
| 2012/0278810 A1* | 11/2012 | Dawson | G06Q 10/06 718/102 |
| 2012/0311204 A1* | 12/2012 | Sugimoto | G06F 3/061 710/74 |
| 2013/0006686 A1* | 1/2013 | O'Sullivan | G06Q 10/06 705/7.13 |
| 2013/0007760 A1* | 1/2013 | O'Sullivan | H04L 29/08468 718/104 |
| 2013/0007761 A1* | 1/2013 | O'Sullivan | G06Q 10/00 718/104 |
| 2013/0024494 A1* | 1/2013 | Guarrieri | G06F 9/5061 709/203 |
| 2013/0185729 A1* | 7/2013 | Vasic | G06F 9/5072 718/104 |
| 2013/0346993 A1* | 12/2013 | Chen | G06F 9/4881 718/103 |
| 2013/0346994 A1* | 12/2013 | Chen | G06F 9/5044 718/104 |
| 2014/0068627 A1 | 3/2014 | Goh et al. | |
| 2015/0012629 A1* | 1/2015 | Verma | H04L 67/10 709/223 |
| 2015/0039764 A1* | 2/2015 | Beloglazov | H04L 47/70 709/226 |
| 2015/0089034 A1* | 3/2015 | Stickle | H04L 41/00 709/223 |
| 2015/0178135 A1* | 6/2015 | Wang | G06F 9/5027 718/104 |
| 2015/0234879 A1* | 8/2015 | Baldwin | G06F 17/30138 707/694 |
| 2016/0112504 A1* | 4/2016 | Mathur | H04L 29/06 709/224 |
| 2016/0247178 A1* | 8/2016 | Gujar | G06Q 30/0208 |
| 2016/0357610 A1* | 12/2016 | Bartfai-Walcott | G06F 9/5027 |
| 2017/0034016 A1* | 2/2017 | Carroll | H04L 41/0813 |
| 2017/0046203 A1* | 2/2017 | Singh | G06F 9/5027 |
| 2017/0093639 A1* | 3/2017 | Dabbagh | H04L 41/12 |

* cited by examiner

Storage Medium *800*

Computer Executable
Instructions for 800

*FIG. 8*

COMPUTING RESOURCES WORKLOAD SCHEDULING

RELATED CASE

This application claims priority to U.S. Provisional Patent Application No. 62/244,156 filed on Oct. 20, 2015, that is hereby incorporated by reference in its entirety.

BACKGROUND

Technological advancements in networking have enabled the rise in use of pooled and/or configurable computing resources. These pooled and/or configurable computing resources may include physical infrastructure for large data centers that may support cloud computing networks. The physical infrastructure may include one or more computing systems having processors, memory, storage, networking, power, cooling, etc. Management entities of these data centers may provision computing resources to virtual computing entities such as virtual machines (VMs) to allocate portions of pooled and/or configurable computing resources in order to place or compose these VMs to support, implement, execute or run a workload such as a certain types of applications. Various types of applications or application workloads may utilize this allocated infrastructure in a shared manner.

BRIEF DESCRIPTION OF THE DRAWINGS

FIG. 8 illustrates an example of a storage medium.

DETAILED DESCRIPTION

Data centers may be generally composed of a large number racks that may contain numerous types of hardware or configurable computing resources (e.g., storage, central processing units (CPUs), memory, networking, fans/cooling modules, power units, etc.). The types of hardware or configurable computing resources deployed in data centers may also be referred to as disaggregate physical elements. The size and number of computing resources and the continual disaggregation of these resources presents practically countless combinations of computing resources that can be configured to fulfill workloads. Also, types of workloads may have different characteristics that may require a different mix of computing resources to efficiently fulfill a give type of workload. It is with respect to these and/or other challenges that the examples described herein are needed.

Figure 1:
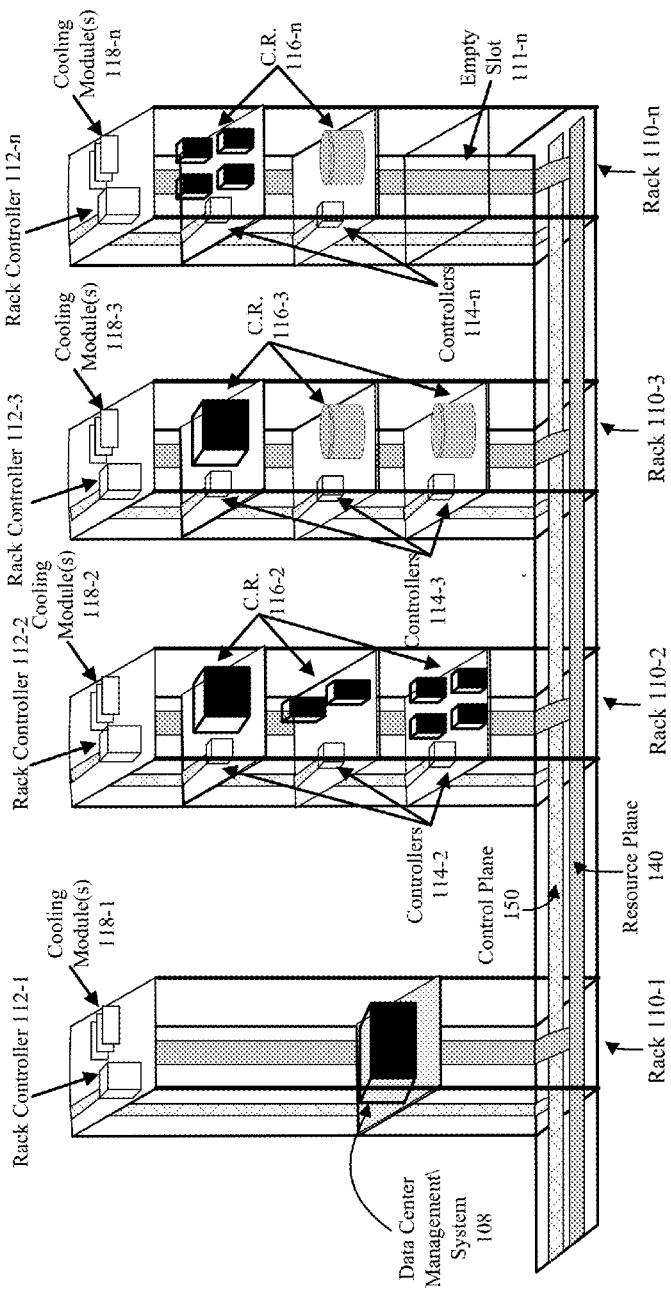
FIG. 1 illustrates an example first system.

FIG. 1 illustrates an example system 100. As shown in FIG. 1, system 100 includes racks 110-1 to 110-$n$, where n is any whole integer value greater than 3. In some examples, as shown in FIG. 1, racks 110-2 to 110-$n$ may be arranged to host respective computing resources (C.R.s) 116-2 to 116-$n$. Also, each shelf or slot of a give rack may include controllers. For example, racks 110-2 to 110-$n$ may include respective controller 114-2 to 114-$n$ for each shelf or slot. Racks 110-1 to 110-$n$ may also include cooling module(s) 118-1 to 118-$n$ to provide cooling capabilities to their respective racks. In some examples, cooling module(s) 118-1 to 118-$n$ may be considered as a type of computing resource. Racks 110-1 to 110-$n$ may also include respective rack controllers 112-1 to 112-$n$. As described more below, controllers located at a given rack may be capable of collecting operating information that may be used build a scoring model which may then be use to evaluate an impact of a workload to be filled or supported by computing resources for a data center similar to system 100.

In some examples, a data center management system 108 may communicate with rack controllers 112-1 to 112-$n$ and controller 114-2 to 114-$n$ via a control plane 150. Data center management system 108 may also manage C.R.s 116-2 to 116-$n$ located within respective racks 110-2 to 110-$n$ via a resource plane 140. This management may include the provisioning of computing resources to fulfill or support a workload and/or scheduling of a workload to computing resources.

In some examples, a process can be employed of utilizing sensor data or operating information produced by each of the server platforms (e.g., located within racks 110-2 to 110-$n$) to develop or build an optimization indicator (OI) scoring model that uses a multi objective algorithm framework to optimize or improve resource allocation by loading a given workload in an efficient manner at a data center level through efficient workload scheduling. Applying this framework may result in more effective or optimal operation of a data center by predicting an impact of scheduling a new or different type of workload and using that information to optimally place the workload in the appropriate resource. The framework may solve for an optimal or comparatively best operating condition (by predicting demands) in the presence of competing objectives that may be related to such attributes as thermal attributes, performance attributes, reliability attributes or power attributes. This framework may render a computationally intractable NP hard optimization problem into an NP complete problem and may result in a computationally feasible problem. The resulting solution is optimal for a specified objective that may be arbitrarily defined based on operator preference.

According to some examples, the OI scoring model may provide an indicator to data center management/system 108 (e.g., configured as data center orchestration software) for logic and/or features of data center management/system 108 to improve work load orchestration within system 100 to imposed constraints such as quality of service (QoS), service level agreement (SLA) objectives or reliability, availability and serviceability (RAS) requirements. The framework may enable improved reliability at a system or data center level while supporting a desired level of performance and throughput consistent with the unique preferences of the operator. In some examples, evaluating objectives related to such attributes as thermal, performance, reliability or power via computer intelligence to optimize cloud workload scheduling may help to achieve more efficient data center management, reduce costs of operation and enhance data center performance.

In some examples, a platform and/or or rack monitoring agent (like firmware and OS drivers) may be arranged to run inside a baseboard management controller (BMC), Management Engine (ME), operating system (OS) driver or any 3rd party agent that may gather operating information. The gathered operating information for computing resources may include, but is not limited to, inlet/outlet temperatures for a platform and/or rack housing, power consumption for a platform and/or rack housing, fan speed for a cooling module for a platform and/or rack housing (e.g., rack 110-2), derived volumetric airflow for a platform and/or rack or available margin to maximum designed or pre-determined operating specifications for computing resources (e.g., maximum utilization capacities or peak operating temperature thresholds). Gathered operating information may also include throttling activation information for such computing resources as CPUs, memory, NW I/O devices, NW switches, VMs, power modules or cooling modules. The throttling activation information may indicate if and for how long throttling was activated over a given time period. For example, responsive to utilization capacities or peak operating temperature thresholds being exceeded over the given time period.

In some examples, the gathered operating information may be conveyed by platform and/or or rack monitoring agent outside the platform via use of an interface and associated protocols such as an intelligent platform management interface (IPMI) described in the IPMI Specification v2.0, rev. 1.1, published in March 2013 (hereinafter the "IPMI specification"), and/or other technologies based on derivatives or extensions of the IPMI specification. Examples are not limited to interfaces and associated protocols as described in the IPMI specification, other interfaces and associated protocols conveying operating information outside the platform are contemplated.

According to some examples, controllers 114-2 to 114-n and/or rack controller 114-1 to 114-n may be capable of supporting a platform and/or rack monitoring agent. For these examples, control plane 150 may be configured to utilized protocols in accordance with the IPMI specification to relay or send operating information to data center management/system 108.

In some examples, logic and/or features of data center management/system 108 may collect the operating information received or forwarded from controllers 114-2 to 114-n and/or rack controllers 114-1 to 114-n. The logic and/or features of data center management/system 108 may at least temporarily store the collected operating information in a database or central repository (not shown).

In some examples, logic and/or features of data center management/system 108 may feed data associated with collected operating information to generate a learned OI scoring model that may then be used to evaluate an impact of a candidate workload to be fulfilled by at least some of the computing resources hosted by racks 110-2 to 110-n (e.g., further provisioned to support multiple VMs). For these examples, machine learning concepts and algorithms may perform OI scoring model learning or training for a given attribute and then this learned OI scoring model is used for estimating or predicting a demand (e.g., air flow demand) comparatively placed on different computing resources. A learned OI scoring model may be built or learned using clustering, regression learning mechanisms similar to support vector machine (SVM) (a type of machine learning linear classifier) or k-means clustering to narrow down the target computing resources. A learned OI scoring model may include use of regression methods to arrive at predicted operating values for use as inputs to the learned OI scoring model to arrive at an OI scoring model predicted value that may be used to quantify the impact of the candidate workload on a computing resource or a grouping of computing resources. As described more below, the determined OI scoring model predicted value may be based on weighted operating values related to one or more objectives associated with one or more attributes.

According to some examples, based on the constraints being imposed on a system such as system 100 (e.g., QoS requirements, SLA objectives or RAS requirements) and the attributes of the workload to be scheduled, a learned OI scoring model may be able to identify one or more comparatively best target VMs to support placement or scheduling of the candidate workload.

In some examples, candidate workloads may have workload profiles that may require differing types of computing resources to support. For examples, a first workload profile may be processing or CPU intensive, a second workload profile may be memory intensive, a third workload profile may be network switch intensive, a fourth workload profile may be storage intensive or a fifth workload profile may have a balanced profile that has relatively equal CPU, memory, network switch and storage intensities.

According to some examples, an OI scoring model may be arranged to consider multiple objectives for utilizing computing resources (e.g., a server or node) in a system such as system 100. The OI scoring model may be used to predict and/or evaluate an overall running status of separate computing resources when supporting a candidate workload. An OI scoring model may be built or learned such that a comparatively best operating balance between the multiple objectives associated with multiple attributes such as, but not limited to, thermal attributes, performance attributes, power attributes or reliability attributes.

In some examples, machine learning models may model each single attribute and then combine all the attributes together by using either weighted sum algorithms or Pareto model algorithms such as non-dominated sorting genetic algorithm-II (NSGA-II) according to the complexity of the problem to generate an OI scoring model predicted value based on a learned OI scoring model. The OI scoring model predicted value may be useful in rebalancing workloads between computing resources included in a data center similar to system 100. For example, based on OpenStack VM operations, an OI scoring model predicted value based on a learned OI scoring model may be used to facilitate scheduling a new workload in a grouping or cluster of computing resources. Also, workloads may be moved or migrated from one computing resource (e.g., a first server) to another computing resource (e.g., a second server) to improve workload balance throughout the data center using OI scoring model predicted values based on the learned OI scoring model.

According to some examples, an OI scoring model may be implemented using an example weighted sum model (WSM). The WSM may resolve objectives related to multiple attributes that may include, but are not limited to, thermal attributes, performance attributes, power attributes or reliability attributes. Example equation (1) may be used for this WSM:

$$OI = w\_pe*\text{perf} + w\_po*\text{power} + w\_t*\text{thermal} + w\_r*\text{reliability} \quad (1)$$

Where: w-pe, w_po, w_t, w_r are respective OI weight factors for performance, power, thermal and reliability attributes $$w\text{-}pe + w\_po + w\_t + w\_r = 1$$

$$w\_pe, w\_po, w\_t, w\_r >= 0$$

For example equation (1), OI weight factors of the four attributes for performance, power, thermal and reliability may be normalized to [0,1] before a WSM calculation.

In some examples, constraining rules may be added to a learned OI scoring model to prevent occurrence of invalid corner cases. For example, an OI scoring model predicted value may be set to a value of 0 if computing resources such as a CPU hits or exceeds a throttle temperature threshold (thermal attribute), if a computing resource such as a memory module hits its throttle temperature (thermal attribute), if a computing resource such as a hard drive temperature is large than 60° Celsius (thermal attribute), a processor cache miss rate exceeds a threshold (performance attribute), network data throughput latencies exceed a threshold (performance attribute), power utilization rates exceed a threshold (power attribute), memory access latencies exceed a threshold (performance attribute) or one or more QoS, RAS or SLA requirements (e.g., failure probabilities, downtime rates, etc.) are predicted not to be met (reliability attributes). Examples are not limited to the above-mentioned constraining rules.

Figure 2:
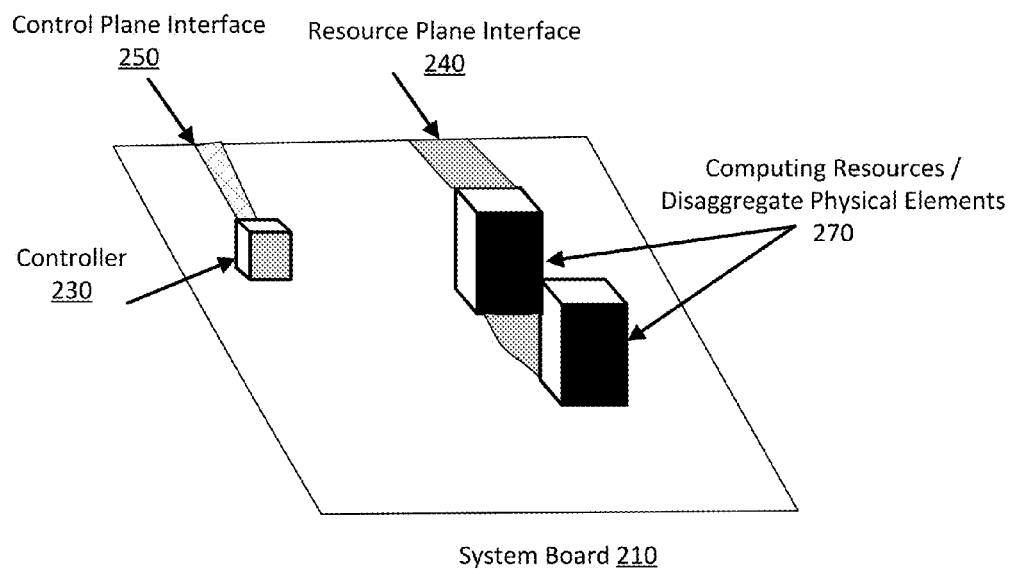
FIG. 2 illustrates an example board.

FIG. 2 illustrates an example board 200. As shown in FIG. 2, board 200 may include a controller 230, a resource plane interface 240, a control plane interface 250 and hardware resources 270. In some examples, hardware resources/disaggregate physical elements 270 may be communicatively coupled to resource plane 140 of system 100 through resource plane interface 240. Also, controller 230 may communicatively couple to control plane 150 of system 100 through control plane interface 250.

According to some examples, hardware resources/disaggregate physical elements 270 may include various types of configurable computing resources or disaggregate physical elements such as, but not limited to central processing units (CPUs) or processors, storage devices, memory devices, NW I/O devices, NW switches, virtual machines, power modules, cooling modules, fans, etc. Also, controller 230 may include logic and/or features capable of providing operating information associated with hardware resources/disaggregate physical elements 270 via a control plane such as control plane 130 to a data center manager (e.g., data center management/system 108). In some examples, controller 230 may be configured or arranged to function as a baseboard management controller (BMC) or manageability engine for hardware resources/disaggregate physical elements 270 to function within a rack such as rack 110-2. Controller 230 may gather or collect operating information to be sent to the data center manager for use in generating one or more learned OI scoring models. The operating information may be sent or forwarded via an IPMI via control plan 130 using protocols in accordance with the IPMI specification.

Figure 3:
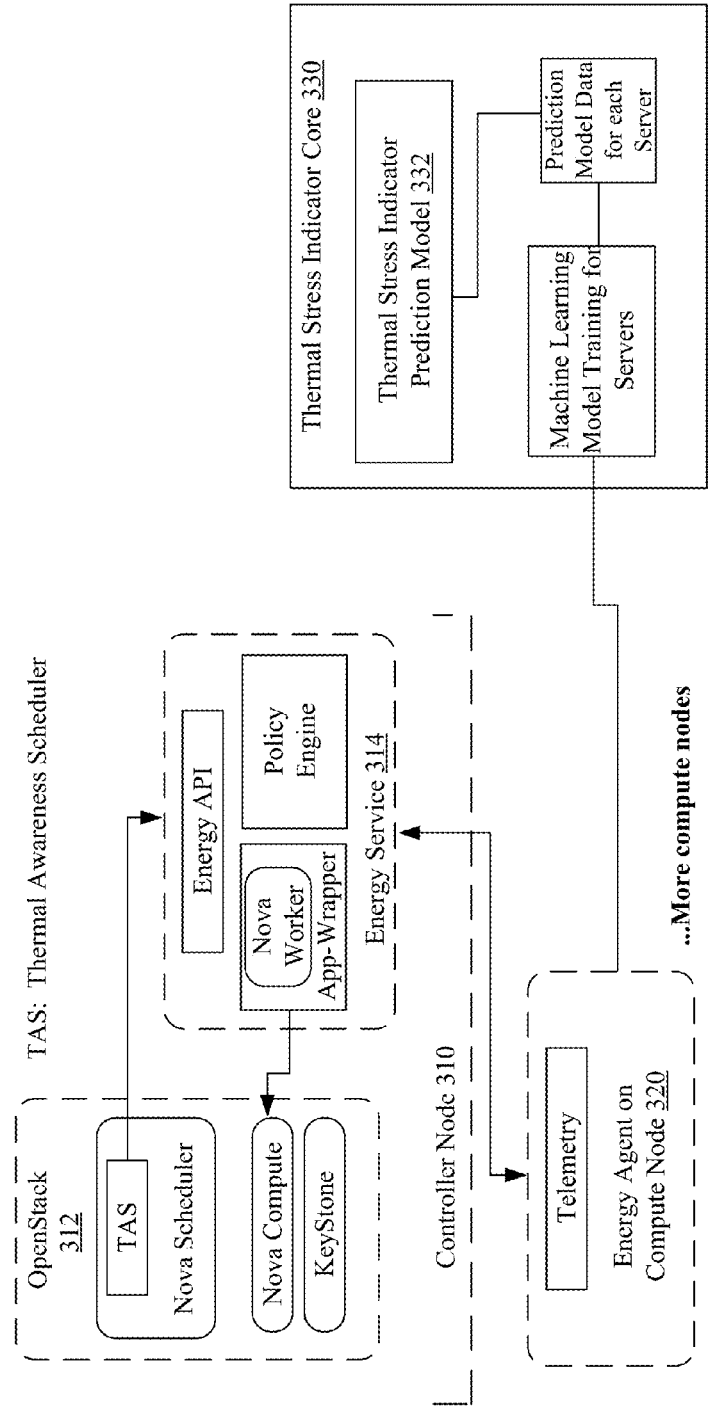
FIG. 3 illustrates an example second system.

FIG. 3 illustrates an example system 300. As shown in FIG. 3, in some examples, system 300 may include a controller node 310 coupled in communication with an energy agent on a compute node 320 and a thermal stress indicator core 330. For these examples, controller node 310 may be located with a data center manager (e.g., located with data center management/system 108) and energy agent on a compute node 320 may be a controller located at a shelf or slot of a rack (e.g., rack 110-2). Also, thermal stress indicator core 330 may also be implemented by other logic and/or features of the data center manager.

In some examples, thermal stress indicator core 330 may be arranged to utilize a thermal stress indicator prediction model 332 to determine an OI scoring model predicted value for an objective related to thermal attributes. For these examples, energy agent at compute node 320 may provide operating information to thermal stress indicator core 330 for possible use in generating a learned OI scoring model. A determined OI scoring model predicted value based on the learned OI scoring model may then be sent to a policy engine for energy service 314 at controller node 310 and then used by OpenStack 312 to schedule a workload. As described more below, this process may be used to evaluate an impact of a workload to be fulfilled by computing resources managed by controller node 310 in order to schedule the workload.

In some examples, a learned OI scoring model may be utilized in an OpenStack nova scheduler included in OpenStack 312 located with controller node 310 as shown in FIG. 3. For these examples, the OI scoring model may be learned separately for each computing resource (e.g., a server) in a computing or OpenStack cluster. When a new workload is to be run in the OpenStack cluster, each computing resource (e.g., server) from that cluster may be tested one by one and a prediction made as to what the computing resource's status would be after adding this new workload to the respective computing resource. Each prediction may be facilitated by the learned OI scoring model for the respective computing resource. A computing resource may then be picked based on the computing resource having the highest OI scoring model predicted value. The new workload may then be scheduled to the picked computing resource.

According to some examples, an OI scoring model may be utilized in OpenStack nova live-migration. For these examples, a computing resource may break an OI objective constraint rule. This may lead to a need to cause one or more workloads to be supported by a different computing resource. Computing resources in a designated target pool may be tested one by one with learned OI scoring models. A prediction may be made of what the status of a given computing resource will be after adding to or causing the migrated workload to be supported by the respective computing resource. This prediction may be done by each computing resource's learned OI scoring model. A computing resource from the destination pool having the highest OI scoring model predicted value may be picked or selected and the migrated workload may then be scheduled to the selected computing resource.

Figure 4:
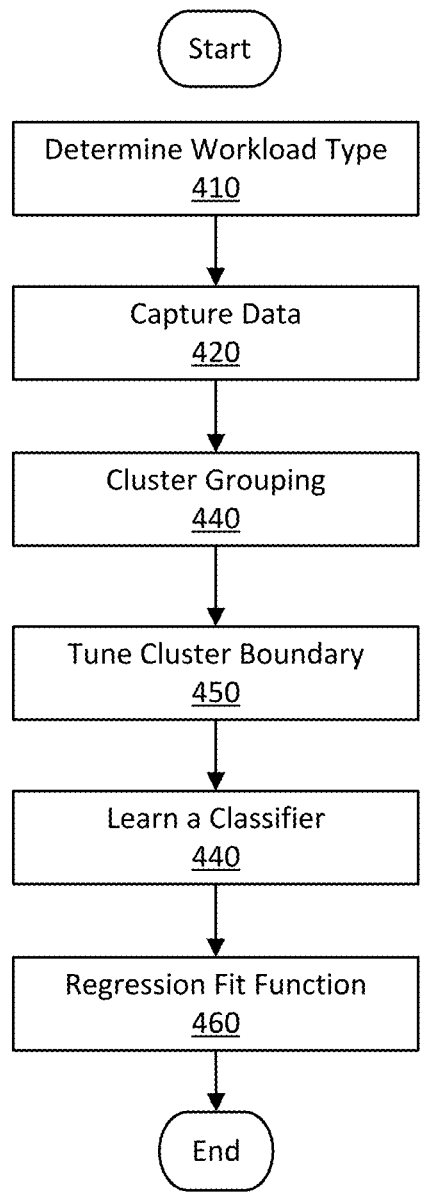
FIG. 4 illustrates an example first flow.

FIG. 4 illustrates an example flow 400. In some examples, flow 400 may be implemented by elements of systems 100, 200 or 300 as shown in FIGS. 1-3. Although flow 400 is not limited to elements included in these systems. For these examples, flow 400 illustrates how an OI scoring model may be learned or built to generate a prediction value for one or more objectives related to one or more given attributes.

At block 410, a workload type or profile may be determined to evaluate impacts on computing resources. In some examples, a control feature is workload distribution (e.g., different workload types or profiles in OpenStack VM operations). For example, workload type or profile may include, but is not limited to whether the workload type or profile is processing or CPU intensive, memory intensive, network switch intensive, storage intensive, a balance of each of these various workload types or profiles or a combinations of these various workload types or profiles.

At block 420, capture data may include capturing or collecting training operating information for different workload running cases. The workloads used in training should envelop the workloads run after deployment. In some examples, capturing training operating information may include collected operating information from computing resources that may be arranged or capable of being arranged to support the determined workload type or profile. For example, a workload type or profile that is processing or CPU intensive may capture training operating information that includes operating information from processing or computing resources. The operating information for a CPU intensive workload, for example, may include, but is not limited to, data associated with cache misses or number of CPU instructions implemented over a given period of time.

At block 430, cluster grouping may include using techniques such as k-means clustering to do cluster grouping for training operating information. For example, use of k-means clustering may include use of a k-means or Lloyd's algorithm to facilitate cluster grouping for the training operating information.

At block 440, tune cluster boundary may include using pre-defined domain knowledge based rules to tune cluster boundaries associated with each determined cluster grouping determined in block 430. The pre-defined domain knowledge based rules may include, but are not limited to, such rules as a CPU idle mode, a fan speed maximum RPM, maximum inlet or outlet temperature, etc.

At block 450, learn a classifier may include using SVM to learn a classifier based on the cluster grouping determined at block 430. In some examples, via use of SVM, captured training operating information may be analyzed to establish patterns and classify the training operating information associated with the workload type or profile.

At block 460, regression fit function may include using a least squares method or approach to assign a regression fit function to the classified training operating information. An example regression fit function prototype may be a linear function. In some examples, the regression fit function may be able to predict operating values related to thermal, performance, power, or reliability attributes that may then be used as inputs to example equation (1) to determine an OI scoring model predicted value. The process then comes to an end.

Figure 5:
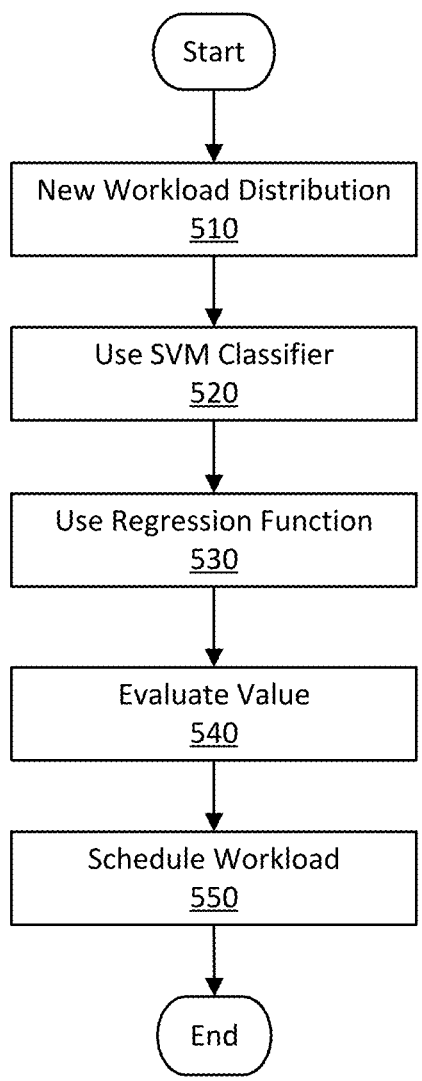
FIG. 5 illustrates an example second flow.

FIG. 5 illustrates an example flow 500. In some examples, flow 500 may be implemented by elements of systems 100, 200 or 300 as shown in FIGS. 1-3. Although flow 500 is not limited to elements included in these systems. For these examples, flow 500 illustrates how to evaluate an impact of a workload to be fulfilled by computing resources included in a system such as system 100, 200 or 300.

At block 510, new workload distribution may cause an evaluation of the impact of the new workload on one or more computing resources (e.g., included in a data center). The new workload, for example, may be associated with a workload type or profile that may be processing or CPU intensive, memory intensive, network switch intensive, storage intensive or a balance of each of these various workload types or profiles.

At block 520, use SVM classifier may include using an SVM as mentioned at block 450 of flow 400 to determine which class the new workload distribution may belong to. In some examples, expected impacts on computing resources based on the new workload's profile or type may be used as one or more input status vectors to the SVM to determine the class.

At block 530, use regression function may include using the regression fit function determined at block 460 for the given class determined in block 520 to calculate the OI scoring model predicted value from an OI scoring model that was learned based on one or more objectives related to one or more attributes. In some examples, each computing resource or grouping of computing resources that may be subjected to the new workload distribution may have separate OI scoring model predicted values calculated.

According to some examples, a WSM may be used to resolve the one or more objectives related to thermal, performance, power, or reliability attributes while calculating the separate OI scoring model predicted values. Example equation (1) may be used to determine the separate OI scoring model predicted values. Use of example equation (1) may include determining an OI weight factor for each of the thermal, performance, power, or reliability attributes. Also, the regression fit function may be used to predict operating values related to or corresponding to the weighted thermal, performance, power, or reliability attributes. The predicted operating values for thermal, performance, power, or reliability attributes may then be used as inputs to example equation (1) along with respective OI weight factors to determine an OI scoring model predicted value.

At block 540, evaluate value may include evaluating the OI scoring model predicted value calculated for each computing resource or grouping of computing resources that may be subjected to the new workload distribution to determine the impact of the new workload distribution on these computing resources. In some examples, the evaluation may include determining which computing resource or grouping of computing resources has the highest OI scoring model predicted value.

According to some examples, constraining rules may also be applied to each evaluated OI scoring model predicted value to prevent occurrence of invalid corner cases. For example, if use of the regression fit function indicates a predicted value related to a thermal attribute such as a memory module hitting a throttle temperature for a given computing resource or grouping of computer resources, the OI scoring model predicted value may be set to 0. Setting the value to 0 may eliminate selection of the given computing resource or grouping of computing resources for supporting the new workload.

At block 550, schedule workload may include scheduling the new workload to at least some of the computing resources based on the evaluation of the OI scoring model predicted value. The process then comes to an end.

Figure 6:
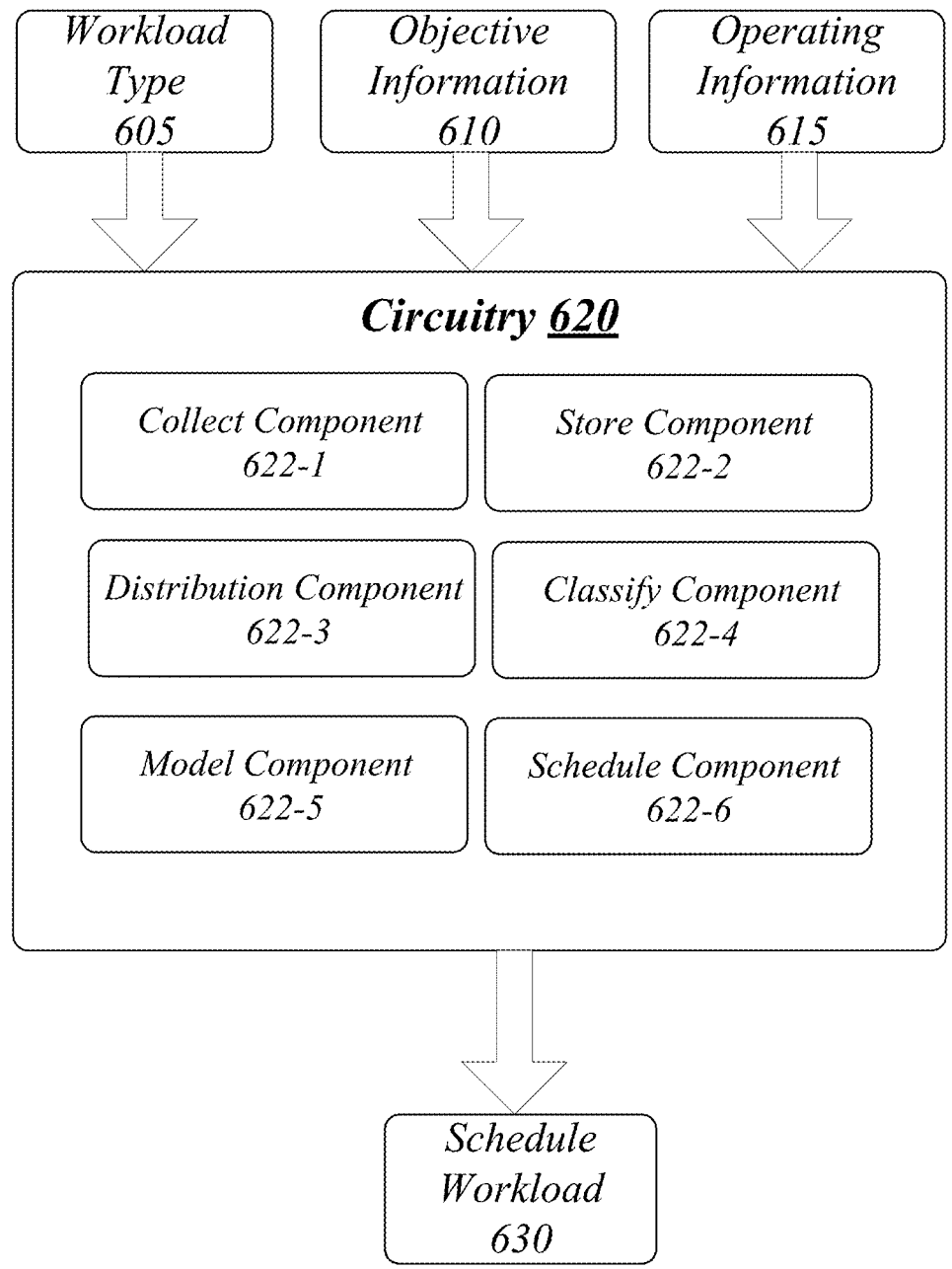
FIG. 6 illustrates an example block diagram for an apparatus.

FIG. 6 illustrates an example block diagram for an apparatus 600. Although apparatus 600 shown in FIG. 6 has a limited number of elements in a certain topology, it may be appreciated that the apparatus 600 may include more or less elements in alternate topologies as desired for a given implementation.

The apparatus 600 may be supported by circuitry 620 maintained at a computing device including logic or features to support a manager or controller for configurable computing resources (e.g. for managing a data center). Circuitry 620 may be arranged to execute one or more software or firmware implemented modules, components or logic 622-$a$. It is worthy to note that "a" and "b" and "c" and similar designators as used herein are intended to be variables representing any positive integer. Thus, for example, if an implementation sets a value for a=6, then a complete set of software or firmware for modules, components or logic 622-$a$ may include component 622-1, 622-2, 622-3, 622-4, 622-5 or 622-6. The examples presented are not limited in this context and the different variables used throughout may represent the same or different integer values.

According to some examples, circuitry 620 may include a processor, processor circuit or processor circuitry. Circuitry 620 may be part of computing device circuitry that includes processing cores (e.g., used as a central processing unit (CPU)). The circuitry including one or more processing cores can be any of various commercially available processors, including without limitation an AMD® Athlon®, Duron® and Opteron® processors; ARM® application, embedded and secure processors; Qualcomm® Snapdragon, IBM®, Motorola® DragonBall®, Nvidia® Tegra® and PowerPC® processors; IBM and Sony® Cell processors; Intel® Celeron®, Core (2) Duo®, Core i3, Core i5, Core i7, Itanium®, Pentium®, Xeon®, Atom®, and XScale® processors; and similar processors. Dual microprocessors, multi-core processors, and other multi-processor architectures may also be employed as part of circuitry 620. According to some examples circuitry 620 may also be an application specific integrated circuit (ASIC) and at least some components, modules or logic 622-a may be implemented as hardware elements of the ASIC.

According to some examples, apparatus 600 may include a collect component 622-1. Collect component 622-1 may be executed by circuitry 620 to collect or receive operating information associated with one or more computing resources of a data center. The operating information may include training operating information and may be collected or received (e.g., from controller at a rack) via operating information 615. The training operating information may be collected responsive to receiving workload type 605 that may indicate a workload type or profile for which collect component 622-1 is to collect or gather the training operating information from the one or more computing resources of the data center while these computing resources support the indicated workload type or profile.

According to some examples, apparatus 600 may also include a store component 622-2. Store component 622-2 may be executed by circuitry 620 to at least temporarily store the training operating information collected or gathered by collect component 622-1.

In some examples, apparatus 600 may also include a distribution component 622-3. Distribution component 622-3 may be executed by circuitry 620 to receive an indication of a workload distribution for a workload to be supported by one or more computing resources of the data center. The workload may be either a new workload or redistributed workload (e.g., migrated from a computing resource). The workload may be associated with a workload type or profile that may be processing or CPU intensive, memory intensive, network switch intensive, storage intensive or a balance of each of these various workload types or profiles.

According to some examples, apparatus 600 may also include a classify component 622-4. Classify component 622-4 may be executed by circuitry 620 to determine a class for the workload based on a workload type or profile for the workload. In some examples, classify component 622-4 may use training operating information collected by collect component 622-1 and stored by store component 622-2 to cluster group the training operating information via k-means clustering, learn a classifier based on the cluster group of the training operating information via a support vector machine (SVM) and assign a regression fit function to classified training operating information classified by the classifier based on a least squares approach.

In some examples, apparatus 600 may also include a model component 622-5. Model component 622-5 may be executed by circuitry 620 to determine predicted operating values for at least one of the one or more computing resources based on the class and input the one or more predicted operating values in at least one scoring model (e.g., a learned OI scoring model) to evaluate the workload being supported by the at least one of the one or more computing resources. According to some examples, objective information 610 may be added to the scoring model as part of the evaluation. Objective information 610 may be related to one or attributes such as thermal attributes, performance attributes, power attributes or reliability attributes. In order to balance objectives related to these attributes, module component 622-5 may determine separate weight factors for individual attributes of a plurality of attributes, at least one predicted operating value from among the predicted operating values to correspond to an individual attribute of the plurality of attributes. Module component 622-5 may then multiply the separate weight factors for individual attributes with corresponding predicted operating values, sum products of the multiplication of the separate weight factors for individual attributes with corresponding predicted operating values to generate a scoring model predicted value and evaluate the workload based on the scoring model predicted value.

In some examples, apparatus 600 may also include a schedule component 622-6. Schedule component 622-6 may be executed by circuitry 620 to schedule the workload to the one or more computing resources based on the evaluation conducted by module component 622-5. Schedule workload 630 may include information directing the computing resources to fulfill and/or support the workload.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 7:
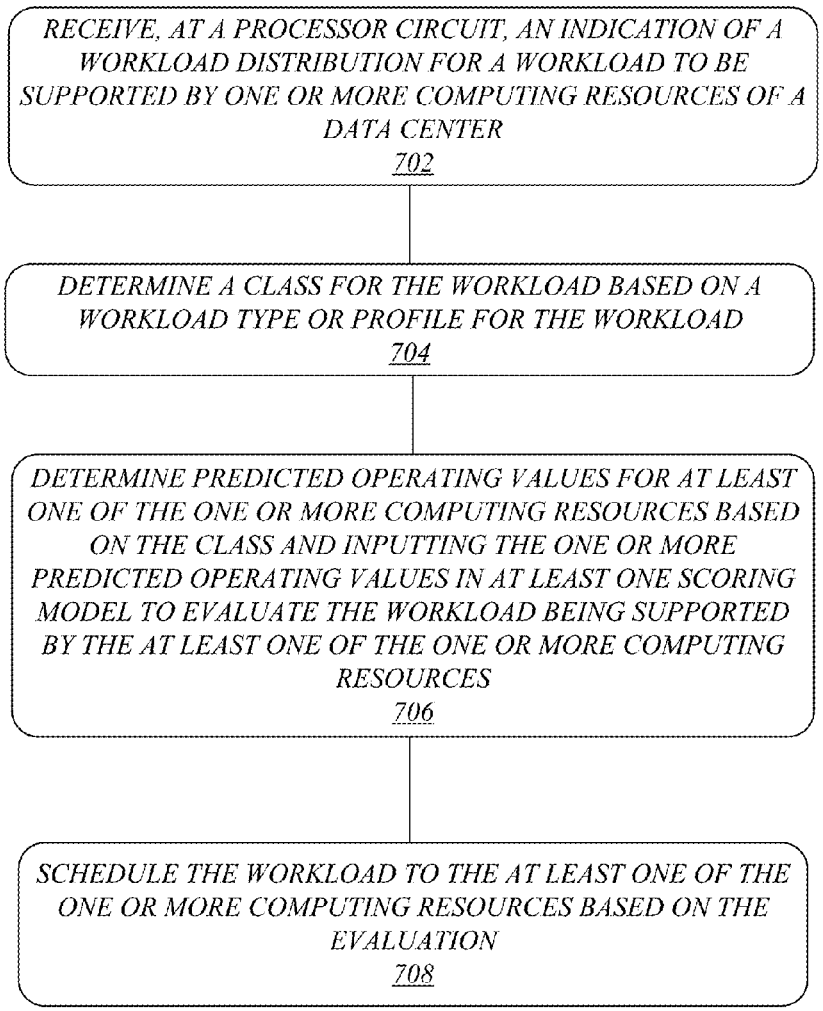
FIG. 7 illustrates an example third flow.

FIG. 7 illustrates an example of a logic flow. As shown in FIG. 7 the logic flow includes a logic flow 700. Logic flow 700 may be representative of some or all of the operations executed by one or more logic, features, or devices described herein, such as apparatus 700. More particularly, logic flow 700 may be implemented by at least distribution component 622-3, classify component 622-4, model component 622-5 or schedule component 622-6.

According to some examples, logic flow 700 at block 702 may receive, at a processor circuit, an indication of a workload distribution for a workload to be supported by one or more computing resources of a data center. For these examples, distribution component 622-1 may receive the operating information.

In some examples, logic flow 700 at block 704 may determine a class for the workload based on a workload type or profile for the workload. For these examples, classify component 622-4 may determine the class for the workload.

According to some examples, logic flow 700 at block 706 may determine predicted operating values for at least one of the one or more computing resources based on the class and inputting the one or more predicted operating values in at least one scoring model to evaluate the workload being supported by the at least one of the one or more computing resources. For these examples, module component 622-5 may determine the predicted operating values and evaluate the workload.

In some examples, logic flow 700 at block 708 may schedule the workload to the at least one of the one or more computing resources based on the evaluation. For these examples, schedule component 622-6 may schedule the workload.

FIG. 8 illustrates an example of a storage medium 800. Storage medium 800 may comprise an article of manufacture. In some examples, storage medium 800 may include any non-transitory computer readable medium or machine readable medium, such as an optical, magnetic or semiconductor storage. Storage medium 800 may store various types of computer executable instructions, such as instructions to implement logic flow 700. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 9:
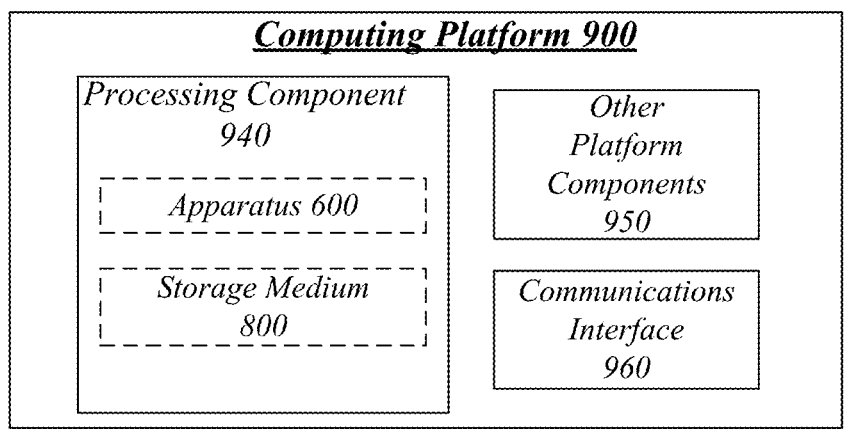
FIG. 9 illustrates an example computing platform.

FIG. 9 illustrates an example computing platform 900. In some examples, as shown in FIG. 9, computing platform 900 may include a processing component 940, other platform components or a communications interface 960. According to some examples, computing platform 900 may be implemented in a computing device such as a server in a system such as a data center or server farm that supports a manager or controller for managing configurable computing resources as mentioned above.

According to some examples, processing component 940 may execute processing operations or logic for apparatus 600 and/or storage medium 900. Processing component 940 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 950 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 960 may include logic and/or features to support a communication interface. For these examples, communications interface 960 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 900 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 900 described herein, may be included or omitted in various embodiments of computing platform 900, as suitably desired.

The components and features of computing platform 900 may be implemented using any combination of discrete circuitry, ASICs, logic gates and/or single chip architectures. Further, the features of computing platform 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 900 shown in the block diagram of FIG. 9 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The following examples pertain to additional examples of technologies disclosed herein.

Example 1

An example apparatus may include circuitry. The apparatus may also include a distribution logic for execution by the circuitry to receive an indication of a workload distribution for a workload to be supported by one or more computing resources of a data center. The apparatus may also include a classify logic for execution by the circuitry to determine a class for the workload based on a workload type or profile for the workload. The apparatus may also include a model logic for execution by the circuitry to determine predicted operating values for at least one of the one or more computing resources based on the class and input the one or more predicted operating values in at least one scoring model to evaluate the workload being supported by the at least one of the one or more computing resources. The apparatus may also include a schedule logic for execution by the circuitry to schedule the workload to the at least one of the one or more computing resources based on the evaluation.

Example 2

The apparatus of example 1, the model logic to input the predicted operating values in at least one scoring model to evaluate the workload may include the model logic to determine separate weight factors for individual attributes of a plurality of attributes, at least one predicted operating value from among the predicted operating values to correspond to an individual attribute of the plurality of attributes. The module logic may also multiply the separate weight factors for individual attributes with corresponding predicted operating values. The model logic may also sum products of the multiplication of the separate weight factors for individual attributes with corresponding predicted operating values to generate a scoring model predicted value.

The model logic may also evaluate the workload based on the scoring model predicted value.

Example 3

The apparatus of example 2, the separate weight factors may be normalized to [0, 1].

Example 4

The apparatus of example 2, the plurality of attributes may include a thermal attribute, a performance attribute, a power attribute or a reliability attribute.

Example 5

The apparatus of example 4, a first predicted operating value corresponding to the thermal attribute may include a predicted operating temperature for at least one of the one or more computing resources. A second predicted operating value corresponding to the performance attribute may include a predicted cache miss rate for at least one of the one or more computing resources. A third predicted operating value corresponding to the power attribute may include a predicted power utilization rate for at least one of the one or more computing resources. A fourth predicted operating value corresponding to the reliability attribute may include a failure probability for at least one of the one or more computing resources.

Example 6

The apparatus of example 5, the model logic may apply one or more constraining rules to the scoring model predicted value to cause the scoring model predicted value to be set to a value of 0 if at least one of the one or more constraining rules are met. For these examples, the one or more constraining rules may include the predicted operating temperature exceeding a throttle temperature threshold for at least one of the one or more computing resources, the predicted cache miss rate exceeding a cache miss rate threshold, the predicted power utilization rate exceeding a power utilization rate threshold or the failure probability exceeding a failure probability threshold.

Example 7

The apparatus of example 1, the one or more computing resources may include one or more of a processor, a memory device, a storage device, a power module, a cooling module, a network input/output device, a network switch or a virtual machine.

Example 8

The apparatus of example 1 may also include a collect logic for execution by the circuitry to gather training operating information for one or more workloads included in the workload type or profile while the one or more computing resources of the data center support the one or more workloads. The apparatus may also include a store logic for execution by the circuitry to store the gathered training operating information. For these examples, the classify logic may use the stored and gathered training operating information to cluster group the training operating information via k-means clustering, learn a classifier based on the cluster group of the training operating information via an SVM and assign a regression fit function to classified training operating information classified by the classifier based on a least squares approach.

Example 9

The apparatus of example 8, the model logic to determine the one or more predicted operating values based on the class may include the model logic to use the regression fit function assigned to the classified training operating information to determine the one or more predicted operating values.

Example 10

The apparatus of example 8, the workload type or profile may include one of a first workload type or profile that is processing or processor intensive, a second workload type or profile that is memory intensive, a third workload type or profile that is network switch intensive, a fourth workload type or profile that is storage intensive or a fifth workload type or profile that is a balanced workload type or profile that has relatively equal processor, memory, network switch and storage intensities.

Example 11

The apparatus of example 8, the training operating information may include an inlet or an outlet temperature for a platform or rack housing the one or more computing resources, a power consumption for a platform or rack housing the one or more computing resources, processor cache miss information, network data throughput latency information, memory access latency information, throttling activation information for the one or more computing resources, margin to a peak operating temperature threshold for the one or more computing resources, or a volumetric airflow for a platform and/or rack housing the one or more computing resources.

Example 12

The apparatus of example 1 may also include a digital display coupled to the circuitry to present a user interface view.

Example 13

An example method may include receiving, at a processor circuit, an indication of a workload distribution for a workload to be supported by one or more computing resources of a data center. The method may also include determining a class for the workload based on a workload type or profile for the workload. The method may also include determining predicted operating values for at least one of the one or more computing resources based on the class and inputting the one or more predicted operating values in at least one scoring model to evaluate the workload being supported by the at least one of the one or more computing resources. The method may also include scheduling the workload to the at least one of the one or more computing resources based on the evaluation.

Example 14

The method of example 13 may include inputting the predicted operating values in at least one scoring model to evaluate the workload based on determining separate weight factors for individual attributes of a plurality of attributes, at least one predicted operating value from among the predicted operating values to correspond to an individual attribute of the plurality of attributes. The method may also include multiplying the separate weight factors for individual attributes with corresponding predicted operating values. The method may also include summing products of the multiplication of the separate weight factors for individual attributes with corresponding predicted operating values to generate a scoring model predicted value. The method may also include evaluating the workload based on the scoring model predicted value.

Example 15

The method of example 14, the separate weight factors may be normalized to [0, 1].

Example 16

The method of example 14, the plurality of attributes may include a thermal attribute, a performance attribute, a power attribute or a reliability attribute.

Example 17

The method of example 16, a first predicted operating value corresponding to the thermal attribute includes a predicted operating temperature for at least one of the one or more computing resources, a second predicted operating value corresponding to the performance attribute includes a predicted cache miss rate for at least one of the one or more computing resources, a third predicted operating value corresponding to the power attribute includes a predicted power utilization rate for at least one of the one or more computing resources and a fourth predicted operating value corresponding to the reliability attribute includes a failure probability for at least one of the one or more computing resources.

Example 18

The method of example 17 may also include applying one or more constraining rules to the scoring model predicted value to cause the scoring model predicted value to be set to a value of 0 if at least one of the one or more constraining rules are met. For these examples, the one or more constraining rules may include the predicted operating temperature exceeding a throttle temperature threshold for at least one of the one or more computing resources, the predicted cache miss rate exceeding a cache miss rate threshold, the predicted power utilization rate exceeding a power utilization rate threshold or the failure probability exceeding a failure probability threshold.

Example 19

The method of example 13, the one or more computing resources may include one or more of a processor, a memory device, a storage device, a power module, a cooling module, a network input/output device, a network switch or a virtual machine.

Example 20

The method of example 13 may also include determining the one or more predicted operating values based on the class may include gathering training operating information for one or more workloads included in the workload type or profile while the one or more computing resources of the data center support the one or more workloads. The method may also include cluster grouping the training operating information using k-means clustering. The method may also include learning a classifier based on the cluster grouping of the training operating information using an SVM. The method may also include assigning a regression fit function to classified training operating information classified by the classifier based on a least squares approach. The method may also include using the regression fit function assigned to the classified training operating information to determine the one or more predicted operating values.

Example 21

The method of example 20, the workload type or profile may include one of a first workload type or profile that is processing or processor intensive, a second workload type or profile that is memory intensive, a third workload type or profile that is network switch intensive, a fourth workload type or profile that is storage intensive or a fifth workload type or profile that is a balanced workload type or profile that has relatively equal processor, memory, network switch and storage intensities.

Example 22

The method of example 20, the training operating information may include an inlet or an outlet temperature for a platform or rack housing the one or more computing resources, a power consumption for a platform or rack housing the one or more computing resources, processor cache miss information, network data throughput latency information, memory access latency information, throttling activation information for the one or more computing resources, margin to a peak operating temperature threshold for the one or more computing resources, or a volumetric airflow for a platform and/or rack housing the one or more computing resources.

Example 23

An example at least one machine readable medium may include a plurality of instructions that in response to being executed by a system may cause the system to carry out a method according to any one of examples 13 to 22.

Example 24

An example apparatus may include means for performing the methods of any one of examples 13 to 22.

Example 25

An example at least one machine readable medium comprising a plurality of instructions that in response to being executed by a system may cause the system to receive an indication of a workload distribution for a workload to be supported by one or more computing resources of a data center. The instructions may also cause the system to determine a class for the workload based on a workload type or profile for the workload. The instructions may also cause the system to determine predicted operating values for at least one of the one or more computing resources based on the class and input the one or more predicted operating values in at least one scoring model to evaluate the workload being supported by the at least one of the one or more computing resources. The instructions may also cause the system to schedule the workload to the at least one of the one or more computing resources based on the evaluation.

Example 26

The at least one machine readable medium of example 25, the instructions to cause the system to input the predicted operating values in at least one scoring model to evaluate the workload may further include the instructions to cause the system to determine separate weight factors for individual attributes of a plurality of attributes, at least one predicted operating value from among the predicted operating values to correspond to an individual attribute of the plurality of attributes. The instructions may also cause the system to multiply the separate weight factors for individual attributes with corresponding predicted operating values. The instructions may also cause the system to sum products of the multiplication of the separate weight factors for individual attributes with corresponding predicted operating values to generate a scoring model predicted value. The instructions may also cause the system to evaluate the workload based on the scoring model predicted value.

Example 27

The at least one machine readable medium of example 26, the separate weight factors may be normalized to [0, 1].

Example 28

The at least one machine readable medium of example 26, the plurality of attributes may include a thermal attribute, a performance attribute, a power attribute or a reliability attribute.

Example 29

The at least one machine readable medium of example 28, a first predicted operating value corresponding to the thermal attribute may include a predicted operating temperature for at least one of the one or more computing resources, a second predicted operating value corresponding to the performance attribute may include a predicted cache miss rate for at least one of the one or more computing resources, a third predicted operating value corresponding to the power attribute may include a predicted power utilization rate for at least one of the one or more computing resources and a fourth predicted operating value corresponding to the reliability attribute may include a failure probability for at least one of the one or more computing resources.

Example 30

The at least one machine readable medium of example 29, the instructions may further cause the system to apply one or more constraining rules to the scoring model predicted value to cause the scoring model predicted value to be set to a value of 0 if at least one of the one or more constraining rules are met. For these examples, the one or more constraining rules may include the predicted operating temperature exceeding a throttle temperature threshold for at least one of the one or more computing resources, the predicted cache miss rate exceeding a cache miss rate threshold, the predicted power utilization rate exceeding a power utilization rate threshold or the failure probability exceeding a failure probability threshold.

Example 31

The at least one machine readable medium of example 25, the one or more computing resources may include one or more of a processor, a memory device, a storage device, a power module, a cooling module, a network input/output device, a network switch or a virtual machine.

Example 32

The at least one machine readable medium of example 25, the instructions to cause the system to determine the one or more predicted operating values based on the class includes the instructions to further cause the system to gather training operating information for one or more workloads included in the workload type or profile while the one or more computing resources of the data center support the one or more workloads. The instructions may also cause the system to cluster grouping the training operating information using k-means clustering. The instructions may also cause the system to learn a classifier based on the cluster grouping of the training operating information using an SVM. The instructions may also cause the system to assign a regression fit function to classified training operating information classified by the classifier based on a least squares approach. The instructions may also cause the system to use the regression fit function assigned to the classified training operating information to determine the one or more predicted operating values.

Example 33

The at least one machine readable medium of example 32, the workload type or profile may include one of a first workload type or profile that is processing or processor intensive, a second workload type or profile that is memory intensive, a third workload type or profile that is network switch intensive, a fourth workload type or profile that is storage intensive or a fifth workload type or profile that is a balanced workload type or profile that has relatively equal processor, memory, network switch and storage intensities.

Example 34

The at least one machine readable medium of example 32, the training operating information may include an inlet or an outlet temperature for a platform or rack housing the one or more computing resources, a power consumption for a platform or rack housing the one or more computing resources, processor cache miss information, network data throughput latency information, memory access latency information, throttling activation information for the one or more computing resources, margin to a peak operating temperature threshold for the one or more computing resources, or a volumetric airflow for a platform and/or rack housing the one or more computing resources.

Example 35

An apparatus comprising: circuitry communicatively coupled to a data center; a distributor for execution by the circuitry to receive an indication of a workload distribution for a workload to be supported by one or more computing resources of a data center; a classifier for execution by the circuitry to determine a class for the workload based on a workload type or profile for the workload; a modeler for execution by the circuitry to determine predicted operating values for at least one of the one or more computing resources based on the class and input the one or more predicted operating values in at least one scoring model to evaluate the workload being supported by the at least one of the one or more computing resources; and a scheduler for execution by the circuitry to schedule the workload to the at least one of the one or more computing resources based on the evaluation.

Example 36

The apparatus of example 35, the modeler to: determine separate weight factors for individual attributes of a plurality of attributes, at least one predicted operating value from among the predicted operating values to correspond to an individual attribute of the plurality of attributes; multiply the separate weight factors for individual attributes with corresponding predicted operating values; sum products of the multiplication of the separate weight factors for individual attributes with corresponding predicted operating values to generate a scoring model predicted value; and evaluate the workload based on the scoring model predicted value.

Example 37

The apparatus of example 36, wherein the separate weight factors are normalized to [0, 1].

Example 38

The apparatus of example 36, the plurality of attributes comprising a thermal attribute, a performance attribute, a power attribute or a reliability attribute.

Example 39

The apparatus of example 38, the predicted operating values comprising a first predicted operating value corresponding to the thermal attribute includes a predicted operating temperature for at least one of the one or more computing resources, a second predicted operating value corresponding to the performance attribute includes a predicted cache miss rate for at least one of the one or more computing resources, a third predicted operating value corresponding to the power attribute includes a predicted power utilization rate for at least one of the one or more computing resources and a fourth predicted operating value corresponding to the reliability attribute includes a failure probability for at least one of the one or more computing resources.

Example 40

The apparatus of example 39, the modeler to apply one or more constraining rules to the scoring model predicted value to cause the scoring model predicted value to be set to a value of 0 if at least one of the one or more constraining rules are met, the one or more constraining rules including: the predicted operating temperature exceeding a throttle temperature threshold for at least one of the one or more computing resources; the predicted cache miss rate exceeding a cache miss rate threshold; the predicted power utilization rate exceeding a power utilization rate threshold; or the failure probability exceeding a failure probability threshold.

Example 41

The apparatus of example 35, the one or more computing resources comprising one or more of a processor, a memory device, a storage device, a power module, a cooling module, a network input/output device, a network switch or a virtual machine.

Example 42

The apparatus of example 35, comprising: a collector for execution by the circuitry to gather training operating information for one or more workloads included in the workload type or profile while the one or more computing resources of the data center support the one or more workloads; and a store for execution by the circuitry to store the gathered training operating information, the classifier to use the stored and gathered training operating information to: cluster group the training operating information via k-means clustering; learn a classifier based on the cluster group of the training operating information via a support vector machine (SVM); and assign a regression fit function to classified training operating information classified by the classifier based on a least squares approach.

Example 43

The apparatus of example 42, the model logic to determine the one or more predicted operating values based on the class comprises the model logic to use the regression fit function assigned to the classified training operating information to determine the one or more predicted operating values.

Example 44

The apparatus of example 42, the workload type or profile comprising one of a first workload type or profile that is processing or processor intensive, a second workload type or profile that is memory intensive, a third workload type or profile that is network switch intensive, a fourth workload type or profile that is storage intensive or a fifth workload type or profile that is a balanced workload type or profile that has relatively equal processor, memory, network switch and storage intensities.

Example 45

The apparatus of example 42, the training operating information comprising an inlet or an outlet temperature for a platform or rack housing the one or more computing resources, a power consumption for a platform or rack housing the one or more computing resources, processor cache miss information, network data throughput latency information, memory access latency information, throttling activation information for the one or more computing resources, margin to a peak operating temperature threshold for the one or more computing resources, or a volumetric airflow for a platform and/or rack housing the one or more computing resources.

Example 46

The apparatus of example 35, comprising a digital display coupled to the circuitry to present a user interface view.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first, " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus comprising:
   circuitry communicatively coupled to a data center;
   a distributor for execution by the circuitry to receive an indication of a workload distribution for a workload to be supported by one or more computing resources of a data center;
   a classify component for execution by the circuitry to determine a class for the workload based on a workload type or profile for the workload;
   a modeler for execution by the circuitry to determine predicted operating values for at least one of the one or more computing resources based on the class and input the one or more predicted operating values in at least one scoring model to evaluate the workload being supported by the at least one of the one or more computing resources;
   a scheduler for execution by the circuitry to schedule the workload to the at least one of the one or more computing resources based on the evaluation;
   a collector for execution by the circuitry to gather training operating information for one or more workloads included in the workload type or profile while the one or more computing resources of the data center support the one or more workloads, the training operating information including an inlet or an outlet temperature for a platform or rack housing the one or more computing resources, a power consumption for a platform or rack housing the one or more computing resources, processor cache miss information, network data throughput latency information, memory access latency information, throttling activation information for the one or more computing resources, margin to a peak operating temperature threshold for the one or more computing resources, or a volumetric airflow for a platform and/or rack housing the one or more computing resources; and
   a store for execution by the circuitry to store the gathered training operating information, the classify component to use the stored and gathered training operating information to:
     cluster group the training operating information via k-means clustering;
     learn a classifier based on the cluster group of the training operating information via a support vector machine (SVM); and
     assign a regression fit function to classified training operating information classified by the classifier based on a least squares approach.

2. The apparatus of claim 1, the modeler to determine the one or more predicted operating values based on the class comprises the modeler to use the regression fit function assigned to the classified training operating information to determine the one or more predicted operating values.

3. The apparatus of claim 1, the workload type or profile comprising one of a first workload type or profile that is processing or processor intensive, a second workload type or profile that is memory intensive, a third workload type or profile that is network switch intensive, a fourth workload type or profile that is storage intensive or a fifth workload type or profile that is a balanced workload type or profile that has relatively equal processor, memory, network switch and storage intensities.

4. The apparatus of claim 1, comprising a digital display coupled to the circuitry to present a user interface view.

5. A method comprising:
   receiving, at a processor circuit, an indication of a workload distribution for a workload to be supported by one or more computing resources of a data center;
   determining a class for the workload based on a workload type or profile for the workload;
   determining predicted operating values for at least one of the one or more computing resources based on the class and inputting the one or more predicted operating values in at least one scoring model to evaluate the workload being supported by the at least one of the one or more computing resources;
   scheduling the workload to the at least one of the one or more computing resources based on the evaluation;
   gather training operating information for one or more workloads included in the workload type or profile while the one or more computing resources of the data center support the one or more workloads, the training operating information including an inlet or an outlet temperature for a platform or rack housing the one or more computing resources, a power consumption for a platform or rack housing the one or more computing resources, processor cache miss information, network data throughput latency information, memory access latency information, throttling activation information for the one or more computing resources, margin to a peak operating temperature threshold for the one or more computing resources, or a volumetric airflow for a platform and/or rack housing the one or more computing resources;
   cluster grouping the training operating information using k-means clustering;
   learning a classifier based on the cluster grouping of the training operating information using a support vector machine (SVM);
   assigning a regression fit function to classified training operating information classified by the classifier based on a least squares approach; and using the regression fit function assigned to the classified training operating information to determine the one or more predicted operating values.

6. The method of claim 5, the workload type or profile comprising one of a first workload type or profile that is processing or processor intensive, a second workload type or profile that is memory intensive, a third workload type or profile that is network switch intensive, a fourth workload type or profile that is storage intensive or a fifth workload type or profile that is a balanced workload type or profile that has relatively equal processor, memory, network switch and storage intensities.

7. The method of claim 5, determining predicted operating values based on the class comprises using the regression fit function assigned to the classified training operating information to determine the one or more predicted operating values.

8. At least one non-transitory machine readable medium comprising a plurality of instructions that in response to being executed by a system causes the system to:
receive an indication of a workload distribution for a workload to be supported by one or more computing resources of a data center;
determine a class for the workload based on a workload type or profile for the workload;
determine predicted operating values for at least one of the one or more computing resources based on the class and input the one or more predicted operating values in at least one scoring model to evaluate the workload being supported by the at least one of the one or more computing resources;
schedule the workload to the at least one of the one or more computing resources based on the evaluation;
gather training operating information for one or more workloads included in the workload type or profile while the one or more computing resources of the data center support the one or more workloads, the training operating information including an inlet or an outlet temperature for a platform or rack housing the one or more computing resources, a power consumption for a platform or rack housing the one or more computing resources, processor cache miss information, network data throughput latency information, memory access latency information, throttling activation information for the one or more computing resources, margin to a peak operating temperature threshold for the one or more computing resources, or a volumetric airflow for a platform and/or rack housing the one or more computing resources;
cluster grouping the training operating information using k-means clustering;
learn a classifier based on the cluster grouping of the training operating information using a support vector machine (SVM);
assign a regression fit function to classified training operating information based on a least squares approach; and
use the regression fit function assigned to the classified training operating information to determine the one or more predicted operating values.

9. The at least one non-transitory machine readable medium of claim 8, the workload type or profile comprising one of a first workload type or profile that is processing or processor intensive, a second workload type or profile that is memory intensive, a third workload type or profile that is network switch intensive, a fourth workload type or profile that is storage intensive or a fifth workload type or profile that is a balanced workload type or profile that has relatively equal processor, memory, network switch and storage intensities.

10. The at least one non-transitory machine readable medium of claim 8, the instructions to cause the system to determine the one or more predicted operating values based on the class comprises the instructions to cause the system use the regression fit function assigned to the classified training operating information to determine the one or more predicted operating values.

* * * * *